3,305,456
MULTIPLE EFFECT EVAPORATION PROCESS
Donald B. Broughton, Chicago, Ill., assignor to Universal Oil Products Company, Des Plaines, Ill., a corporation of Delaware
Filed June 27, 1963, Ser. No. 291,099
19 Claims. (Cl. 203—11)

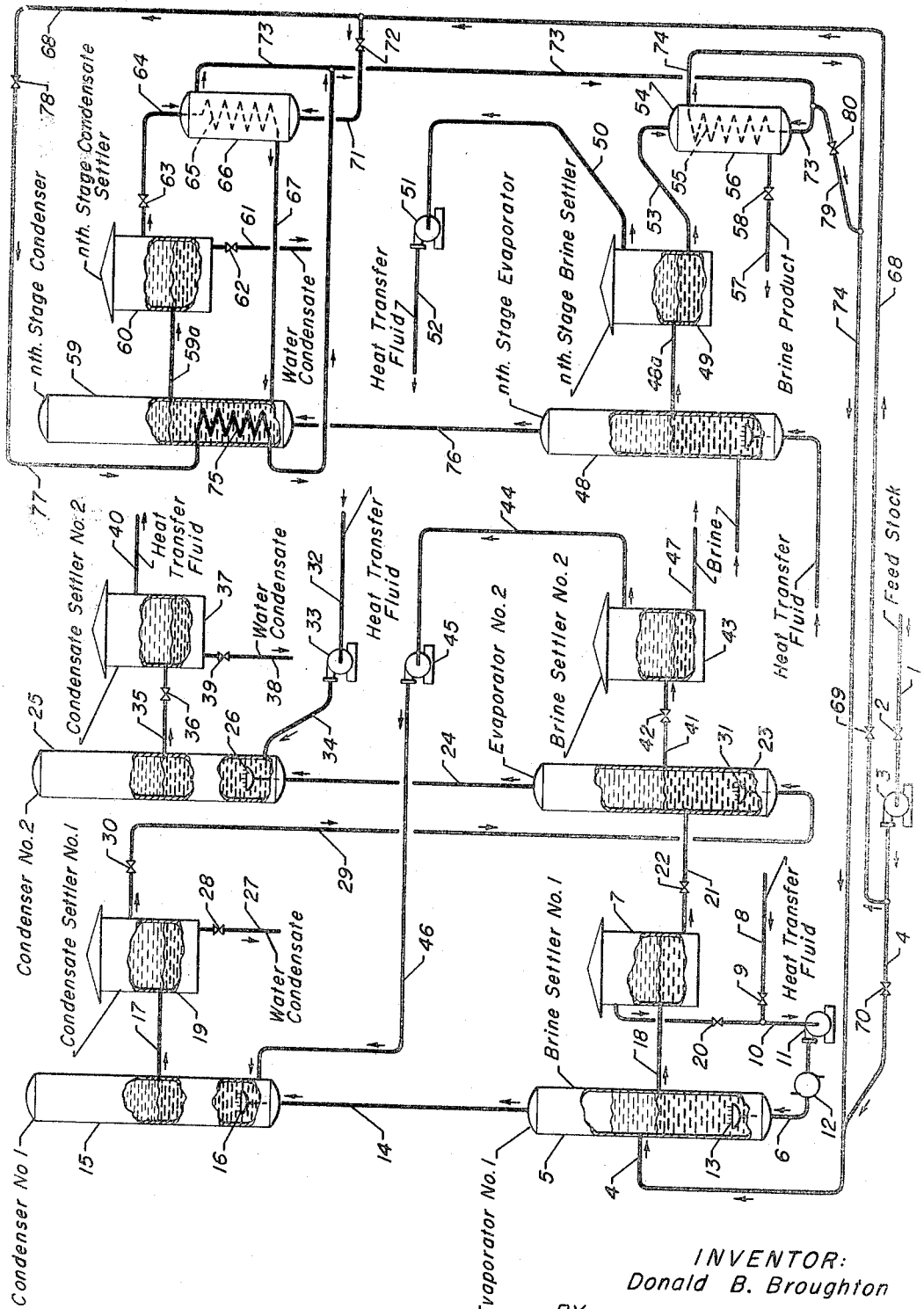

This invention relates to a process for recovering volatile liquids from salt solutions, particularly solutions which contain dissolved salts which precipitate as a scale-forming deposit upon heating and/or upon the removal of solute from the feed solution by evaporation. More specifically, this invention concerns an improved method for evaporating liquids from solutions containing scale-forming salts dissolved as solutes in the feed stock solution by contacting said solution with a heat transfer fluid supplied to the evaporation zone at a temperature above the boiling point of the solution, the fluid being a liquid substantially insoluble in the solvent and having a boiling point substantially greater than the boiling point of said solution at the pressure maintained in the evaporation zone.

It is well-known and widely recognized that one of the most critical and troublesome problems associated with the production of steam by evaporating water from most of the commonly available natural sources of water supply is the accumulation of scale on the heat transfer surfaces, such as the interior surfaces of boilers, evaporators, condensers, etc. The resulting scale reduces the efficiency of heat transfer because of the substantially lower heat conductivity of the scale as compared to the aqueous solution in contact with the hot surface from which the necessary heat of evaporation is acquired. Most natural sources of water supply contain in solution the carbonate, bicarbonate and sulfate salts of the alkaline earth metals, such as calcium, magnesium, strontium and barium which are only slightly soluble in water. As the water containing such solutes is heated and/or evaporated from such solutions, the alkaline earth metal salts and particularly the bicarbonates (which at the higher temperature required for evaporation are converted to the much less water-soluble carbonate salts) precipitate out of solution and deposit on the surfaces of the heat transfer vessel in contact with the feed water supply. The resulting scale deposit then becomes the hot surface by conduction of heat from the primary source of heat supply on the opposite surface and additional scale coming out of solution deposits on the surface of the scale already present, the layer of scale thereby gradually increasing in thickness as evaporation continues. The deposition of scale at the point of steam formation reduces the heat transfer efficiency because of the substantially lower conductivity of the scale deposit as a heat transfer medium than the metal or glazed surface of the vessel containing the solution. Hence, the heat transfer rate and efficiency constantly decline as the thickness of the scale increases. As the heat-insulating scale increases in thickness on the heat transfer surface, the temperature required to effect heat transfer through the insulating scale into the liquid phase increases and temperature differentials of from 30 to 100° C. are often necessary to effect the further evaporation. Frequently, at this point, a slight fissure forms through the scale, exposing a small surface of the scale-free heat transfer surface, resulting in the rapid and a most explosive generation of vapors beneath the scale. In many of such instances the action is so violent that damage to the equipment results.

The tendency toward the scale formation is particularly apparent in aqueous solutions rich in alkaline earth metal carbonates, such as sea water and the tendency toward scale deposition has been one of the major sources of problems arising in the recovery of fresh or desalinized water from sea water. One of the methods heretofore proposed for solving the problem of scale formation has been the treatment of the feed stock with an insoluble resin which selectively exchanges an alkali metal ion present in the resin with the alkaline earth metal ion in the feed stock solution, thereby replacing the alkaline earth metal ion with alkali metal ion such as sodium. However, such treatment results in no net reduction in the concentration of solutes in the feed stock and substantially increases the cost of the recovered water because of the relatively costly ion exchange treatment.

The process of the present invention provides a means for evaporating solvents from their salt solutions in a multiple-effect evaporation system, particularly for evaporating solutions containing scale-forming solutes, including aqueous solutions containing alkaline earth metal solutes, by direct heat exchange between the feed stock solution and a heated heat transfer liquid, the present method eliminating the high temperature heat transfer surfaces of heat exchanger tubes and vessel walls upon which the scale-forming deposit forms in the usual process of heating the feed water supply. Thus, the present method does not treat the feed stock solution to either chemically or physically remove the scale-forming components from the feed water supply, but eliminates the locus of the problem which is the heat exchange surface on which the scale-forming deposit would otherwise accumulate.

One object of this invention is to provide a process for recovering a volatile liquid from a solution of said liquid and a dissolved solute which by conventional heat transfer means form a scale on the heat transfer surface through which the transfer of heat occurs at a much slower rate than through the feed solution. Another object of this invention is to enhance the efficiency of evaporating solute-free water from sea water containing alkaline earth metal, scale-forming salts in solution. Still another object of this invention is to reduce the cost of evaporating volatile liquids from salt solutions containing scale-forming components in the solution.

In one of its embodiments this invention relates to a multiple effect evaporation process for separating a volatile solvent from a solution of a non-volatile salt in said solvent, each effect comprising an evaporation zone and a vapor condensation zone which is connected in vapor flow relationship to its associated vaporization zone, the pressure maintained in each effect being less than the pressure maintained in the last preceding upstream effect of the series, said process comprising contacting directly the solution in each evaporation zone with a heat transfer liquid supplied at an elevated temperature relative to the temperature of said solution, said heat transfer liquid being essentially immiscible with said solution and boiling at a temperature substantially greater than the boiling point of said solution, withdrawing the resulting solvent vapor from each evaporation zone, into the condensation zone directly associated with the evaporation zone, contacting solvent vapors in said condensation zone with a relatively cool heat exchange medium which in each effect except in the last effect of the series consists of heat transfer liquid recovered from the evaporation zone of the next succeeding downstream effect in series, separating heat transfer liquid at a relatively elevated temperature from solvent condensate liquid present in each condensation zone into which relatively cool heat transfer liquid is charged and recycling the recovered heat transfer liquid to the evaporation zone of said next succeeding downstream effect.

A more specific embodiment of this invention concerns a process for recovering water from an aqueous salt solution containing a scale-forming component which precipitates from solution upon heating said salt solution, said process comprising contacting in a first stage evaporation zone said salt solution with the vapors of a hydrocarbon having a boiling point exceeding the boiling point of the salt solution at the same pressure, separately condensing in a first stage condensation zone overhead water vapor formed in said first stage evaporation zone in the presence of relatively cool hydrocarbon liquid, separated from the mixture of salt solution residue and hydrocarbon liquid recovered from the next downstream second stage evaporation zone, separately recovering hydrocarbon from the resulting liquid water-hydrocarbon mixture in said first stage condensation zone at an elevated temperature relative to the hydrocarbon liquid entering said first stage condensation zone, separating a residual first stage evaporation brine from the first stage evaporator hydrocarbon liquid, mixing said first stage brine with the liquid hydrocarbon recovered from the first stage condensation zone in a second stage evaporation zone, reheating the liquid hydrocarbon separated from the brine residue of the first stage evaporation zone and recycling the resulting heated hydrocarbon to said first stage evaporation zone, withdrawing brine concentrate from the last stage evaporation zone in the series comprising the process flow and discharging said brine from the process, and condensing steam in the last condensation zone in the series with a cooling medium of lower temperature than the steam entering said last stage condensation zone and separating water product from the liquid condensate in each condensation zone of the series.

Although the present process is pre-eminently qualified for the treatment of nominally "hard" water containing calcium and magnesium ions in solution, for example, to supply a source of water for steam generation purposes (as in steam turbine-powered electrical generating plants utilizing high pressure steam for operation of multiple-effect turbines), one of the particularly useful applications of the process is the recovery of ion-free water from sea water for human consumption, for irrigation purposes, etc. In such applications, as well as in many others, the treatment of the feed stock to remove scale-forming solutes represents the stage of the overall process of greatest cost. These scale-forming components present in the feed water supply readily precipitate out of solution when it is heated and deposit a heat insulating incrustation on the surfaces of vessels in which the feed water supply is heated. In other instances the scale-forming components are carried via entrainment in the steam from the evaporating unit and precipitate as the scale on the surfaces of equipment contacted with the steam. The resulting scale-formation is especially objectionable when the equipment contacted with the high pressure steam are the blades of a high speed rotor in a multiple effect turbine. Even when present in minute quantities, as in chemically treated water, the entrainment results in costly repairs and lack of service for such equipment.

Even so-called "fresh" water sources of supply, such as water from Lake Michigan, contains over 40 p.p.m. of such scale-forming components such as calcium and magnesium salts and lesser concentrations of iron, sodium and potassium salts, as well as silica. These components are held in solution by such anions as chloride, sulfate and particularly bicarbonate which is present in such fresh water lake supplies in concentrations up to 140 p.p.m. The total dissolved solids in oceanic waters is in the region of 33,000 p.p.m., depending upon its source, and the combined calcium and magnesium scale-forming solute content of sea water is generally in the region of about 1700 p.p.m, with the concentration of bicarbonate as high as 130 p.p.m. Accordingly, any attempt to produce steam by evaporation of water from either "fresh" or brackish waters, characterizing most natural sources of supply, must contend with the problem of scale formation by virtue of the presence of alkaline earth metals in the feed stock as solubilized bicarbonates which, upon heating, are converted to carbonates and, together with other ionic forms of these metals, precipitate a scale on the surface of the heating equipment in the form of a heat-insulating incrustation. Utilizing the present method of introducing heat into a feed stock solution wherein a fluid substantially insoluble in the feed stock solution is mixed with the latter solution at an inlet temperature of the fluid exceeding the boiling point of the solvent at the pressure existing in the evaporation zone, all of the heat required for evaporation is supplied to the feed solution as latent and sensible heat contained in the heat transfer fluid. The scale-forming components present in the feed stock solution which precipitate on being heated or upon evaporation of a portion of the solvent, precipitate in the form of finely divided suspended particles of solid which either remain in suspension or settle to the bottom of the vessel in which the evaporation takes place as a light flocculent solid instead of a heat-insulating incrustation or scale. The precipitated solid is periodically or continuously removed from the evaporator by removal of a slip-stream of the solution for filtration, followed by reintroduction of the clear filtrate into the evaporation system. It is evident that through such direct contact of the heat transfer fluid (as a hot liquid in each effect of a multiple-effect system), the relatively cooler solution residue in the evaporator vessel of each stage extracts substantially all of the sensible heat from the heat transfer liquid at the pressure existing in each stage of the multiple-effect system. The use for this purpose of a heat transfer fluid which is insoluble in the feed solution and of higher boiling point than the solution provides an operable process with many specific advantages in a multiple-effect evaporation flow.

Although the advantages inherent in the present method of introducing heat into the evaporation zone is also realized in the single-effect system in which the residual brine remaining after the first stage of the operation is discarded from the process flow, the use of a heat transfer fluid in each effect of a multiple-effect evaporation process is especially advantageous because maximum heat transfer from the standpoint of both rate of transfer and quantity of heat transferred is realized when the heat carrier is contacted intimately and directly with the heat recipient. In the present multiple-effect system the temperature and pressure is gradually reduced stepwise in each downstream effect, a system which lends itself to the stepwise transfer of heat from one effect to the next effect. The condensation of the vapors in the presence of the heat transfer liquid and circulating the resulting heated liquid to the next downstream effect wherein the heat of vaporization absorbed in the condenser of the preceding effect is released to the solution residue at a lower pressure provides the present multiple effect improvement of the basic process.

The process herein provided is further described and illustrated in the accompanying diagram which illustrates a multiple-effect evaporation process for recovering water from a saline solution, such as sea water; it is to be emphasized however that the process of this invention is not necessarily limited to the specific process flow therein described nor to the feed stock used as an illustrative example of the feed stocks capable of being treated in the manner herein provided.

Referring to the accompanying diagram, a feed stock solution containing scale-forming solute components, such as sea water in which the scale-forming components comprise significant proportions of calcium and magnesium bicarbonates, sulfates, etc., in solution is fed into the process flow through line 1 at a rate controlled by valve 2 which is adjusted to permit feed stock to enter at a rate proportioned to the rate of supplying heat into the evaporation zone of the first effect in series. Pump 3 provides the necessary pressure to lift the feed stock through line 4 into the process flow. As hereinafter described, the feed stock solution, in an alternative flow arrangement, is preheated prior to its entry into the first effect by heat exchange with the effluent heat transfer fluid from the last effect of the series, with the residual brine solution from the last effect, and/or with the water condensate streams from each effect, thereby recovering the residue of heat present in one or all of the latter streams, as hereinafter described.

The present multiple-effect evaporation process involves a series of evaporating vessels or kettles, the first vessel in the series being indicated on the accompanying diagram as evaporation zone No. 1 in vessel 5. The rate of charging feed stock solution in addition to being determined by the rate of supplying heat to the liquid solution, as indicated above, is in any event sufficient to maintain the level of the liquid solution in vessel 5 at the solution-heat transfer liquid interface as both liquids are continuously withdrawn from the interface through line 18 into brine settling tank 7, connected in fluid flow relationship to evaporator vessel 5. Preferably, the feed stock solution is charged into evaporation at or nearly at its boiling point at the ambient pressure in vessel 5.

In accordance with the present process, heat is added to the liquid solution in the evaporation zone by charging into vessel 5 at an elevated temperature and preferably on a continuously cyclic basis, a stream of heat transfer fluid in either liquid or vapor form, the fluid having a boiling point (at the pressure maintained in the evaporation zone) above the boiling point of the solvent to be recovered from the feed stock solution, which in the case of sea water, for example, is water. The heat transfer medium is also selected from fluids which in their liquid state, are insoluble or substantially insoluble in the feed stock solution as well as in the solvent vaporized and condensed from the feed stock solution. The preferred heat transfer fluids have sufficiently high boiling points to remain in liquid phase as they are heated in the first effect heater, boiling at least 30° C. and more preferably at least 80° C. above the boiling point of the feed stock solution.

Depending upon the volatile solvent comprising the feed stock solution, which in the present process is to be recovered as free of solute as possible, the boiling point and chemical composition of the heat transfer fluid will be different for various solutes and solvents comprising the feed stock solution. In the case of recovering water from its aqueous solutions a particularly suitable heat transfer fluid is selected from the normally liquid hydrocarbons which as a class, are substantially insoluble in water or its aqueous solutions and more particularly, from certain members of the various homologous series of hydrocarbons having boiling points above the boiling point of water. One of the preferred classes of heat transfer fluids for use in recovering water from aqueous solutions are the aliphatic paraffins containing at least 8 carbon atoms per molecule, and more preferably, from 10 to 20 or more carbon atoms per molecule. Useful individual paraffins in the series begin with normal octane which has a boiling point of about 126° C. at 760 mm. pressure, including normal nonane (B.P. 151° C.), n-decane (B.P. 174° C.), n-undecane (B.P. about 196° C.), n-dodecane (B.P. 216° C.), n-hexadecane (B.P. 280° C.), etc., up to and including such hydrocarbon as eicosane, tricosane, and triacontane, as well as mixtures thereof which may also include other classes of hydrocarbons. Although the normal or straight chain species of the aliphatic hydrocarbons are particularly suitable herein, the branched chain (such as one or a mixture of the iso-octanes or a gas oil fraction of petroleum) and the cycloparaffins, such as trimethylcyclohexane and cycloheptane are also usable in the present process as the heat transfer fluid. The corresponding mono- or polyhalogenated analogs of the foregoing hydrocarbons, such as hexachlorocyclohexane, perfluorohexane, perfluoro-n-octane, etc., are also utilizable herein, the perfluoro analogs having other properties which make them advantageous for additional reasons, such as high stability and low foaming tendency. Of the aromatic hydrocarbon species, toluene (B.P. 111° C.), the various xylene isomers (B.P. 138 to 145° C.), cumene (B.P. 152° C.), ethylbenzene (B.P. 136° C.) and other aromatics are suitable heat transfer fluids, but less desirable than the aliphatic species because of their greater solubility in most solvents. Although most polycyclic aromatics boil at temperatures which exceed the desirable maximum for water recovery, biphenyl (B.P. 290° C.) and dibenzyl (B.P. 284° C.) are usable bicyclic aromatics herein. Certain ethers such as di-n-amyl ether (B.P. 188° C.), di-n-hexyl ether (B.P. 209° C.), diphenyl ether (B.P. 259° C.) and anisole (B.P. 154° C.) are suitable materials for use herein as heat transfer fluids. The large number of other classes of organic compounds, such as the alkyl halides, the esters and ketones also constitute suitable classes of materials for use as heat transfer fluids.

The present process is especially adapted to the recovery of water from its aqueous solutions containing inorganic salts in solution; however, by properly selecting a suitable heat transfer liquid (i.e., one that is immiscible with not only the feed stock solution but also with the solvent and boiling at a temperature above the boiling point of the solution), the present process can be adapted to solutions in which the solvent is an organic compound, such as acetone, ether, hexanol, benzene, etc. Thus, inorganic compounds having low melting points and which are insoluble in organic solvents may be utilized as heat transfer liquids, including such compounds as the antimony halides ($SbCl_3$:73.4° C., $SbCl_5$:2.3° C.), the arsenic halides ($AsBr_3$:31° C., $AsCl_3$:—18° C., $AsF_3$:—85° C., etc.) and certain metallic elements such as bismuth (M.P.:271° C.), gallium (M.P.:29.8° C.), cesium (M.P.:28.5° C.), mercury (M.P.:—38.9° C.), sodium (M.P.:97.5° C.), potassium (M.P.:62.9° C.), tin (M.P.:231.9° C.), and sulfur (M.P.:112° C.), as well as low melting point alloys of certain metals such as Brittonia metal (mixture of tin and antimony and various mixtures of bismuth, lead, tin and cadmium having melting points of from 47° C. to 290° C. The metals such as mercury, bismuth, cadmium, etc., may also be utilized as heat transfer materials to evaporate water from an aqueous solution, particularly at high pressures.

Being substantially insoluble in the solvent evaporated from the feed stock solution, the initial charge of heat transfer fluid in each effect is generally sufficient to operate the process on a continuous basis for a long period of operation, the fluid being continuously recycled in each effect of the process series and recovered again for recycle. Make-up portions of heat transfer fluid to account for losses from the first effect over long operating periods is charged into recycle line 10 from storage through line 8 in amounts controlled by valve 9.

In accordance with the method of operating the present process shown in the accompanying diagram comprising an inherent feature of the process flow arrangement illustrated, the mixture of brine residue and heat transfer fluid in the evaporation zone of each effect in series, withdrawn from the interface in each evaporator vessel into the brine settling vessel connected to each evaporator, is permitted to separate into two layers in the brine settling tanks and the upper layer heat transfer fluid (being generally the phase of least density in vessel 7) is continuously withdrawn as the mixture is continuously charged into the vessel from the upstream evaporation zone and at a somewhat cooler temperature (generally, from 0.5 to 5°F. below the upstream evaporation zone temperature) from which the brine residue was withdrawn, depending upon heat losses from the system.

When referred to herein, "downstream" is intended to designate a point in the line of fluid flow yet to be encountered, whereas "upstream" refers to a retrospective point in the line of fluid flow, a point already encountered in the past.

The heat transfer fluid recovered as the upper layer from the brine settling vessel in each effect is, except in the first effect of the series, recycled to the condensation zone of the next preceding or "upstream" effect where it provides a heat sink for the heat of condensation of the solvent vapors entering the preceding condensation zone and thereby liquefies the solvent vapors. The heat transfer liquid, now at an elevated temperature, is returned in toto to the evaporation zone from which it was withdrawn where the heat of condensation absorbed from the vapors of the upstream effect evaporates solvent from the brine solution in the effect from which it was withdrawn. Thus, a closed flow circulation system for the heat transfer liquid is provided between the condensation zone of one effect and the evaporation zone of the next downstream effect (that is, between each adjacent pair of effects in the series), the quantity of heat transfer liquid circulating between adjacent effects thereby being maintained substantially constant. These relationships are true for every process involving more than two effects, except in the first effect and the last effect of any series, as hereinafter more fully described. The present invention is generally applicable to any series of $n$ multiple effects where $n$ is the total number of effects in the series, at least two, up to about 20 and usually not greater than about 10.

In accordance with the present process the heat transfer liquid separating in the brine settling vessel of the first effect in the series of $n$ effects is withdrawn from the upper layer (above the lower layer brine in which it is essentially insoluble) through line 10 by means of pump 11 which recycles the liquid through heater 12 and line 6 into evaporation zone 5 of the first effect. Heater 12 is operated at a temperature sufficient to reheat the heat transfer liquid to a more elevated temperature, sufficient at the selected volume rate of recycle, to supply the heat required in evaporation vessel 5 to vaporize the amount of solvent required or intended to be recovered from the solution in the number of effects provided for the process. Thus, the rate of introducing heat into the feed stock solution, as determined by the temperature and flow rate of the heat transfer fluid supplied to the evaporation zone of the first effect, predetermines the amount of solvent evaporated and the quantity of heat ultimately available in the succeeding effects of the series.

The heat transfer fluid is preferably charged continuously into each evaporation zone through a means, such as a spray head 13, which disperses the fluid into finely divided droplets, the resulting liquid droplets thereby having a large heat transfer surface per volume of fluid as the latter contacts the liquid feed solution existing as a lower layer in the evaporator. Preferably, further, the distributing means is positioned in the lower portion of vessel 5 so as to provide maximum contact time between the droplets of heat transfer fluid and solution as the immiscible fluid rises through the feed solution in the bottom of the evaporator vessel. The reat transfer fluid is preferably a liquid of lesser density than the feed solution and may be introduced as either a hot liquid or as vapor into the evaporation zone. If it enters as a vapor, the fluid condenses to a liquid while giving up its heat of vaporization to the feed solution, the resulting droplets of condensed heat transfer fluid coalescing and accumulating as a liquid layer above the feed solution residue (referred to herein as "brine") in column 5.

The heat transferred to the feed solution by the heat transfer fluid at an elevated temperature vaporizes solvent from the feed solution and these vapors tend to accumulate as a separate phase above the level of liquid in vessel 5. As the vapor pressure of the solvent vapors increases in vessel 5 the vapors of volatilized solvent are removed from the vapor space above the surface of the liquid in vessel 5 through line 14 into the first condensation zone of the multiple-effect series indicated as vessel 15. Because of the properties of the heat transfer fluid, being preselected to provide a liquid of substantially greater boiling point than the boiling point of the solution (at least 30° C. and more preferably, at least 80° C. above the boiling point of the solution), little if any heat transfer fluid leaves evaporation zone 5 as vapor with the solvent vapors. Heat of condensation of the solvent vapors entering condenser 15 is transferred to the relatively cooler liquid heat transfer fluid removed as hereafter described from the brine settling vessel of the next downstream effect. By thus charging relatively cool heat transfer fluid into the first stage condenser, not only is the temperature of the heat transfer fluid increased for subsequent use as the source of heat for the second stage evaporator, but the heat transfer fluid also provides a heat sink for condensation of the vapors removed from the first stage evaporation zone.

The vapor distributor utilized in the condensation zone may be similar to the distributor used in evaporation zone 5, such as spray nozzle 16. As the solvent vapors from the first stage evaporator give up their heat of condensation to the liquid heat transfer fluid phase present in vessel 15, the vapors condense to form a two-phase mixture, an upper, low density heat transfer fluid phase and a lower condensed liquid solvent phase of greater density. The efficiency of heat transfer from the vapors entering the bottom of vessel 15 and the relatively cooler liquid heat transfer fluid from the second stage brine settling vessel is optimized by charging cool heat transfer liquid into the lower portion of vessel 15 and permitting convective forces to carry heated fluid into the upper levels of the vessel.

The two liquid phases existing in the first stage condenser and the first stage evaporator (vessels 15 and 5, respectively) are withdrawn from these vessels at the interface between the liquid layers therein so as to withdraw portions of both the upper and lower liquid phases existing in each of the vessels simultaneously from each of the layers, from vessel 15 through line 17 and from vessel 5 through line 18. The mixture of liquids withdrawn from condenser 15 are discharged into the first stage condensate settler vessel 19 and the liquid layers from the interface in the first stage evaporator vessel 5 are discharged into first stage brine settling vessel 7.

The mixture of immiscible liquids flowing into first stage condensate settling vessel 19 and into first stage brine settling vessel 7 separate on standing into two liquid layers, an upper, low-density heat transfer fluid phase in each settling vessel and a lower, high-density aqueous phase consisting of pure water condensate in vessel 19 and aqueous brine solution residue in vessel 7. The heat transfer fluid in the first stage brine settling vessel 7 is at substantially the boiling point of the brine residue existing in the first stage evaporator, cooled only to the extent that the heat has been lost in being transferred from evaporator 5 into settling vessel 7. After reheating the heat transfer fluid to the temperature required to maintain the desired evaporation rate in evaporator 5, as described above, the resulting fluid at an elevated temperature (relative, that is, to the temperature of the solution in vessel 5) is recycled into the lower portion of the first stage evaporation zone 5.

The lower layer in the first stage brine settling vessel 7, consisting of the residue of feed solution remaining after the first stage evaporation and at substantially the boiling point of the feed solution in the first stage evaporation zone, is withdrawn from below the heat transfer liquid-brine solution interface in vessel 7 through line 21 at a rate controlled by valve 22 (limited by the necessity for maintaining an interface between the two liquid layers in vessel 7 above the inlet to line 21) and is thereafter discharged into the second stage, or next succeeding downstream evaporation zone provided in vessel 23, maintained at a somewhat lower pressure than the pressure provided in the first stage evaporation zone of vessel 5. At the latter reduced pressure in the second stage evaporator, vapors of solvent spontaneously formed as the ambient pressure on the solution drops are removed from vessel 23 through vapor outlet conduit 24, entering the second stage condensation zone in vessel 25 through a suitable vapor distributing means, such as spray head 26, rising upwardly through the superadjacent liquids which accumulate in vessel 25, and exchanging heat with the liquid as the vapors contact the relatively cooler liquid phase.

The mixture of liquids removed from the liquid interface in the first stage condenser vessel 15 and which separate into two layers in the first stage condensate settling vessel 19 comprise recovered solvent, free of the solute components originally present in the feed stock solution. Usually, the recovered solvent constitutes at least one of the desired end products of the present process and is accordingly drained into a solvent condensate storage vessel, not shown on the accompanying diagram. Condensed solvent is removed from the lower layer in the first stage condensate settling vessel 19 through line 27 at a rate controlled by valve 28 which is limited to maintain sufficient solvent as a liquid layer in vessel 19 to provide the required interface therein. The solvent, which may in some instances contain a small quantity of dissolved heat transfer fluid comprising the upper liquid layer in settler vessel 19 (especially when the liquids are somewhat mutually soluble) may be removed therefrom to provide solvent substantially free of heat transfer liquid by passing the recovered solvent through a bed of an adsorbent, such as activated charcoal, clay, alumina or other adsorbent selectively retentive of organic compounds and collecting the purified solvents as effluent of the adsorption zone.

The upper layer accumulating in the first stage condensate settling vessel 19 consists of heat transfer fluid having substantially the same temperature as the boiling point of the solvent vapors liquefied in condenser vessel 1 and is therefore capable of supplying the latent heat of vaporization required to distill solvent from the brine solution entering the second stage evaporation zone from the sensible heat content of the heat transfer fluid. Such multiple effect distillation is feasible only because the second stage evaporation zone is operated at a somewhat lower pressure (and therefore, at a somewhat lower boiling point) than the solution supplied to the first stage evaporation zone. For this purpose the layer of heat transfer fluid (as a hot liquid) is withdrawn from the upper layer accumulating in settling vessel 19 through line 29 at a rate controlled by valve 30, limited to the volume required to maintain a liquid layer above the interface between condensed solvent and heat transfer fluid in vessel 19, thereafter flowing into the second stage evaporation zone (vessel 23) through a fluid distributing means such as spray head 31. As the heat transfer fluid from the first stage condensate settler enters the second stage evaporation zone 23, maintained at a lower pressure, the heat transfer fluid rises through the lower liquid phase consisting of first stage brine solution residue. As evaporation of solute proceeds at the lower pressure in vessel 23, the temperature of the brine tends to fall, extracting sensible heat from the heat transfer fluid supplied to vessel 23 from line 29.

The heat transfer fluid which is insoluble in the residual brine and which is introduced into vessel 23 as a stream of liquid influx accumulates as an upper liquid layer in vessel 23 through which the solvent vapors generated in the brine ascend in leaving the second stage evaporation zone through line 24. As in the first stage condensation zone, the vapors of solvent enter near the bottom of the second stage condenser and rise through a layer of solvent condensate which is cooled by relatively cool heat transfer fluid recovered from the brine settling vessel of the next succeeding downstream effect, which may be the third or the last (i.e., the $n$th) stage in the series. The heat transfer fluid is shown on the accompanying diagram as entering the 2nd stage condenser through line 32, under pressure supplied by pump 33 and line 34. In a system in which the third stage or effect is the last or $n$th effect of the series heat transfer fluid would be supplied to pump 33 and thence to the second stage condenser by connecting line 50 to line 32.

In a multiple-effect system as provided in this invention, if the last stage in the series of evaporation-condensation zones is referred to as the $n$th stage, the liquid heat transfer fluid supplied into the $n$th stage condenser is recovered from the upper layer in the $n$th stage condensate settling vessel, as hereinafter more fully described; in every preceding intermediate stage of the series of effects, including the first effect, however, the heat transfer fluid supplied to any particular condensation zone is recovered from the upper layer of the brine settling vessel in the next succeeding downstream stage of the series.

The solvent vapors which enter second stage condenser vessel 25 and which therein contact the relatively cool liquid heat transfer fluid condensate via heat exchange with the heat transfer fluid into a liquid condensate and accumulate as a lower liquid layer in vessel 25, transferring its heat of condensation to the heat exchange liquid. The resulting two liquid phases, each mutually insoluble in the other, form two liquid layers in second stage condensation zone 25 having an interface between the layers. Both layers are withdrawn simultaneously from condenser 25 at the interface, through line 35 at a rate equal to the total volume of influent liquids, controlled by valve 36, the mixture thereafter flowing into the second stage condensate settling vessel 37 wherein a lower, condensed solvent phase separates from an upper heat transfer liquid phase. The lower layer condensed solvent, constituting a portion of the combined total solvent product recovered from the series of effects is withdrawn from the lower layer in vessel 37 through line 38 at a rate controlled by valve 39 to storage or for further purification to remove heat transfer fluid, if present in the solvent, as previously described for the solvent recovered from the first stage condensate product.

As in the operation of the first stage condensate settling vessel, the upper layer heat transfer fluid, now heated to an elevated temperature by virtue of its acquired heat of condensation, is charged as the source of heat into the next stage evaporation zone by means similar to the transfer of heat transfer fluid from the first stage condensate settling zone into the second stage evaporation zone, the heat transfer fluid being withdrawn from the upper layer in vessel 37 through line 40 and transferred as shown figuratively in the accompanying diagram, into the next downstream evaporation zone which may be the third stage in the series of effects or the last evaporation zone of the series.

The two layers of immiscible liquids accumulating in the second stage evaporation zone (vessel 23), consisting of an upper layer of heat transfer fluid in liquid form and a lower layer brine residue are removed simultaneously from the interface between the liquid layers in vessel 23 through line 41 and valve 42 into second stage brine settling vessel 43 wherein the mixture of liquids, on standing, separate into two liquid, relatively immiscible layers. The upper layer heat transfer fluid is removed from vessel 43 through line 44 and transferred upstream by means of pump 45 into line 46 which conveys the heat transfer liquid (now cooled to the lower temperature maintained in the second stage evaporation zone) into the lower portion of the first stage condensation zone (vessel 16) to supply the source of heat sink fluid for recovering the heat of vaporization from the first stage solvent vapors fed into vessel 16. If X represents any particular stage in the present series of multiple-effect evaporation zones specified herein, except the first stage in the series of evaporation-condensation zones, the heat transfer fluid phase from the brine settling vessel of stage X is transferred in accordance with the present process flow arrangement into the next preceding upstream or the $X-1$ condensation zone. Such recycle of the heat transfer fluid to the preceding upstream condensation zone is provided, as hereinbefore described, for every effect except the first stage in the series; in said first effect, the heat transfer fluid is withdrawn from the brine settling vessel of the first effect, reheated to the heat transfer fluid inlet temperature and recharged directly into the evaporation zone of the first stage; thus, it is recycled directly to the evaporation zone.

The lower liquid layer accumulating in the second stage brine settling vessel 43, comprising brine of greater solute concentration than the solution entering the 2nd stage evaporation zone is removed from the latter vessel through line 47 and is thereafter charged into the third stage evaporator, not illustrated on the accompanying diagram, which, in a 3-stage multiple effect process would be the last or $n$th stage of the series. If X represents any particular stage in the series of multiple-effect evaporators except the last or $n$th stage, the layer of brine accumulating in said X stage brine settling vessel is charged into the $X+1$ evaporator, in accordance with the process flow provided in this invention. The disposition of the brine solution from the last or $n$th stage of the series is specified hereinbelow.

Although two stages have been described in the preceding specifications and illustrated in the accompanying diagram and a third stage has been referred to but not illustrated, the number of stages in any particular multiple-effect evaporation system is determined by the operating characteristics of the system, and particularly by the boiling point of the solvent, the number of permissible stages being proportional to the differential in temperature between the boiling point of the solution at the starting pressure and the boiling point of the solution at the somewhat (often substantially) reduced pressure in the final stage of the multiple effect system.

In any multiple-effect series of evaporation zones utilizing the process flow of this invention, if $n$ represents the last stage of the series, the heat transfer fluid from the $n$th stage condensate settling zone is transferred not into the next downstream evaporation zone, as in every preceding stage of the series (since no further downstream evaporation zones exist beyond the $n$th stage); rather, the heat transfer fluid phase of the $n$th stage condensate settling zone is withdrawn therefrom, cooled via heat transfer to a cooler heat exchange medium, such as air or cooling water to reduce its temperature, and thereafter recycled into the $n$th stage condensation zone where it provides the heat sink essential to the condensation of solvent vapors entering the condensation zone from the $n$th stage evaporation zone.

Referring further to the accompanying diagram, intermediate stages between the 2nd stage and the final or $n$th stage of the series are omitted from illustration, since such intermediate stages are but repetitions of the 2nd stage which is illustrated. In the interest of simplicity and brevity, the $n$th stage evaporation zone and its associated $n$th or final stage condensation zones only are illustrated to indicate the disposition of the streams entering and leaving the $n$th stage evaporation and condensation zones.

The manner of heat exchanging the heat transfer fluid withdrawn from the $n$th stage condensate settling zone and the brine residue of the $n$th stage evaporation zone to thereby recover most of the heat initially introduced into the feed stock solution is shown with reference to a particular source of cooling medium for effecting such heat exchange. The source of fluid for use as the cooling medium to remove sensible heat from the aforementioned ultimate effluent streams is provided by heat exchanging these effluent process streams with relatively cool feed stock solution which in any event must be heated prior to entering the first stage evaporation zone. Thus, by adoption of the heat exchange procedure illustrated in the accompanying diagram, most of the heat initially introduced into the present multiple effect series may be in large measure recovered, enhancing the ultimate efficiency of the process, especially if the water condensate product streams recovered from each of the condensation zones in the series, as hereinafter described, are also heat exchanged with the feed stock solution.

The recovery of the sensible heat present in the heat transfer fluid effluent of the last stage in the series and the heat present in the brine concentrate product which in the last effect of the series may still be at a substantially elevated temperature relative to the feed stock solution is effected by a heat exchange procedure involving the transfer of heat present in these streams to the feed stock solution through an indirect heat exchanger, such as a jacketed coil through which the hot and cold fluids are circulated in separate channels. Thus, the mixture of liquid heat transfer fluid and brine residue withdrawn from the interface of these liquids in the $n$th stage evaporation zone 48 is charged through line 48a into vessel 49, the brine settling vessel of the $n$th or last effect of the series. The mixture settles therein on standing into a two phase liquid system. The upper layer consisting of heat transfer fluid is withdrawn at substantially the same rate it is introduced into vessel 49 through line 50 and transferred by means of pump 51 and line 52 to the condensation zone of the $n-1$ effect or the last preceding upstream effect of the series wherein the heat transfer fluid from the $n$th stage brine settling zone functions as the heat sink liquid for recovery of the quantum of heat present in the solvent vapors of the preceding $n-1$ condensation zone, all in accordance with the present process flow.

The lower layer brine residue accumulating in vessel 49 which, in an abbreviated series of multiple effects may still be at a substantially elevated temperature relative to the feed stock solution, is withdrawn as rapidly as it is introduced into vessel 49 through line 53 into a heat exchange zone illustrated on the accompanying diagram as heat exchanger 54. Cold feed stock solution flows into heat exchanger 54 in heat exchange relationship with the hot brine solution, through coil 55 from a source hereinafter more fully referred to, while simultaneously the hot brine residue from settling vessel 49 flows through an enclosure surrounding coil 55, such as jacket 56, the brine residue, now reduced in temperature via heat exchange in heat exchange unit 54 is withdrawn through line 57 at the aforementioned rate, determined by valve 58.

The brine concentrate may also constitute one of the products, and in fact may be the primary end flow of the process, being discharged from the process flow, removed to storage, or directed into further evaporation facilities (not illustrated) for the recovery of the solute component(s), for example, by further evaporation of solvent from the solute.

In the final stage of the series of evaporation-condensation zones of the present multiple effect system the mixture of solvent condensate and liquid heat transfer fluid withdrawn from the interface between the two layers of liquids accumulating in the $n$th or last stage condensation zone 59 is charged through line 59a into $n$th stage condensate settling vessel 60. The mixture of liquids entering condensate settling zone 60 settles on standing into two layers having an interface between the lower water condensate layer and the upper heat transfer fluid layer. The water condensate, comprising one of the products of the present process is withdrawn from below the interface through line 61 at a rate controlled by valve 62 corresponding substantially to the influx rate of liquid condensate into vessel 59, being thereafter transferred to storage as a portion of the water condensate product of the process.

The upper phase heat transfer fluid in liquid form, still containing a recoverable quantity of heat at a temperature above the feed stock temperature, depending upon the number of stages provided in the process flow, is withdrawn from the upper layer in vessel 60 at substantially the same rate as the flow rate of heat transfer fluid into vessel 60, as determined by valve 63 in line 64. The heat transfer fluid thereafter flows through a suitable heat exchange unit such as coil 65, surrounded by jacket 66 through which the feed stock solution is circulated, the latter solution heat exchanging with the heat transfer fluid circulating through coil 65. The heat transfer fluid after yielding its heat content to the substantially cooler feed stock solution is withdrawn from heat exchanger 66 through line 67 and recirculated as the source of heat exchange (heat sink) fluid into the $n$th stage condensation zone 59. The heat exchange fluid absorbs the heat of condensation from the solvent vapors which enter condenser 59 through line 76 from the $n$th stage evaporation zone. Thereafter, the condensate and liquid heat transfer fluid are charged into condensate settling vessel 60 as hereinabove described, preferably on a continuously cyclic flow basis.

When operating the present process in the manner hereinabove described for recovery of a major proportion of the residual heat contained in the heat transfer fluid from the $n$th stage condensate settling vessel and/or the heat content of the brine removed from the $n$th stage of the brine settling vessel, the feed stock solution charged into the process through line 1, as previously described, is diverted from line 4 into line 68 by opening valve 69 in line 68 and by closing valve 70 in line 4. The feed stock solution in line 68 thereafter flows into the jacket of heat exchanger 66 through line 71 and valve 72 as the source of coolant flowing around coil 65, described above. The feed stock solution enters the process flow at a substantially lower temperature than the heat transfer fluid leaving the $n$th stage condensate settling vessel and increases in temperature as the liquids flow downwardly through the heat exchanger. Depending upon the efficiency of heat exchange between coil 65 and the cool feed stock solution surrounding it, the heat transfer fluid leaving coil 65 through line 67 has by means of such heat exchange been reduced substantially to the outlet temperature of the feed stock solution leaving heat exchanger 66 through line 73. Because the flow rate of feed stock solution charged into the process provides a greater heat sink than the limited quantity of heat available by heat exchange with the heat transfer fluid recovered from the $n$th stage condensation zone, the feed stock solution from heat exchange unit 66 may further be utilized as heat exchange medium or heat sink fluid in heat exchanger 54, thereby transferring to the incoming feed stock solution an additional quantity of heat form the brine product stream and thereby concomitantly reducing the amount of heat required to raise the solution to its boiling point in evaporation zone 1 of the first effect. By adopting the procedure of preheating the normally cold feed stock solution with heat recovered from the product streams, heat which otherwise would be considered as waste heat and which would otherwise present a burdensome disposal problem is recovered to enhance the overall efficiency of the process. The sea water effluent of heat exchanger 66 enters heat exchanger 54 through line 73 which becomes coil 55 and after heat exchanging with hot brine circulating in jacket 56 leaves heat exchanger 54 at the outlet end of coil 55 and flows into line 74 which connects with line 4 leading into evaporation zone 1, wherein the feed solution is continuously further heated to its boiling point to effect evaporation of the solvent therefrom. In general, optimum heat recovery from the effluent streams of the present process is realized by employing a countercurrent flow effect, by first heat exchanging the cool influent feed stock solution with the coolest of the various effluent streams and thereafter heat exchanging the effluent of the first heat exchange zone with the next hottest effluent product. In the process illustrated in the accompanying diagram, the cool feed stock solution is first heat exchanged in unit 66 with the effluent heat transfer fluid of the $n$th stage condensation zone and thereafter with the brine residue of the $n$th stage evaporation zone in heat exchanger 54; however, the order of these heat exchangers may be reversed since both the brine residue and the heat transfer fluid are at approximately the same temperature. Alternatively, the feed stock may be circulated through only one of the heat-exchangers, such as unit 54, the effluent being discharged directly from line 73 into line 74 through line 79, as determined by valve 80.

It is also feasible to increase further the recovery of heat from the effluent product streams of the process such as the heat present in the water condensate product, further reducing the amount of heat required in the first effect to raise the temperature of the feed solution to its boiling point and enhancing further the efficiency of the process. Thus, the effluent feed solution of heat exchanger 54 may be further directed into heat exchangers connected in heat exchange relationship with the effluent water condensate streams from each effect (not shown on the accompanying diagram), starting with condensate from the $n$th effect (the coolest product in the series) and eventually heat exchanging the feed solution with the condensate of the first effect (the highest temperature condensate), providing a countercurrent heat gradient relationship.

The process illustrated and described above, involving a multiple effect evaporation system of "$n$" effects in which the feed stock solution is preheated by heat exchange with the heat transfer fluid recovered from the $n$th stage condensation unit in heat exchanger 66 may, in an alternative flow arrangement, be operated to eliminate the heat transfer fluid in the $n$th stage condensation unit and simultaneously recover the heat of condensation from the solvent vapors entering condensation zone 59 by direct heat exchange in coil 75. The latter coil is continuously supplied with relatively cool feed stock solution flowing in heat exchange relationship through the coil, absorbing heat of condensation from the solvent vapors which condense to liquid condensate on the outside of coil 75. Feed stock solution which flows into coil 75 from line 77 enters line 77 from line 68 by closing valve 72 in line 71 and opening valve 78 in line 77. The level of liquid condensate maintained in condensation zone 59 is sufficient to cover coil 75 and as solvent vapors enter condenser 59 from evaporator 48 through line 76, condensing on coil 75, the resulting liquid condensate accumulates in vessel 59 and eventually overflows into settling vessel 60 from which it is removed to storage through line 61 and valve 62, as aforesaid. The direct heat exchange thereby obtained between the sea water charge stock and the solvent vapors entering condensation zone 59 provides an effective and efficient means of recovering the residue of heat contained in the vapors formed in the last effect of the series and recovers the heat in a form useable directly in the process flow.

At some intermediate stage or after each stage in the multiple effect series of evaporators the precipitate which may form in each of the evaporator vessels as solvent is evaporated from the feed stock solution and as the temperature of the residual brine decreases, is generally filtered therefrom, for example, by removing a bleed stream of the brine residue solution from the lower liquid layer in the evaporator or from the lower liquid layer of the brine settling vessels, passing it through a filter and recycling the filtrate to the evaporator or to the brine settling vessel, thereby removing the precipitated solute components from the brine residue, and particularly the scale-forming solute components of low solubility. Although such additional treatment of the brine solution is not illustrated herein the treatment is important when the brine residue constitutes a desirable ultimate product of the process flow.

The present invention is further illustrated with respect to several of its specific embodiments in the following examples, which, however, are not to be construed to limit the generally broad scope of the invention necessarily in accordance with said embodiments.

*Example I*

In the following example, a process for evaporating substantially pure, salt-free water from sea water in a multiple effect evaporation system in seven stages is described, the multiple-effect system utilizing a water-insoluble, non-volatile heat transfer liquid to absorb the heat of condensation from the water vapor in the vapor condensation zone of one effect to heat the liquid brine in the next downstream evaporator operated at a lower pressure, in accordance with the process of this invention. The sea water initially withdrawn from Atlantic coastal waters at a temperature of 43° F. is permitted to heat exchange with air at summer temperatures by storage in aboveground vats and enters a feed stock heating coil at 71° F. in which it is heated to a temperature of 215° F., its approximate boiling point, prior to entering the first effect evaporator. Sea water containing approximately 33,000 parts per million (p.p.m.) or about 3.3 weight percent of dissolved solids was utilized as feed stock to the process. The sea water feed stock contains the following components in the indicated proportions:

TABLE I.—APPROXIMATE COMPOSITION OF SEA WATER WITH RESPECT TO ITS MAJOR COMPONENTS

| Element: | Content, p.p.m. |
|---|---|
| Chlorine | [1] 18,980 |
| Sodium | [1] 10,561 |
| Magnesium | 1,272 |
| Sulphur | [2] 884 |
| Calcium | [2] 400 |
| Potassium | 380 |
| Bromine | 65 |
| Carbon | 28 |
| Strontium | 13 |
| Boron | 4.6 |
| Flourine | 1.4 |

And less than 1 p.p.m. each of most other common mineral elements.

[1] Sodium chloride: 2,940 p.p.m.
[2] Calcium sulfate: 1,800 p.p.m.

The small but significant quantities of calcium, magnesium and barium chlorides, sulfates, bicarbonates and carbonates precipitate from solution when the water content of the sea water is reduced by evaporation of water therefrom. Raising the temperature of the sea water also causes the alkaline earth metal bicarbonates present in solution to decompose to the less soluble carbonates which thereupon precipitate on the surface of heating elements immersed in and in contact with the sea water. Thus, as sea water is distilled and the resulting vapors are removed from the still and condensed in a water-cooled condenser, the boiling point of the residual brine gradually increases as the solution also increases in dissolved solids content. Substantially from the point of initial heating of the sea water, solids which previously were entirely in solution form a precipitate on the surface of the steam heating coil and a finely divided precipitate consisting of calcium, magnesium and barium compounds give the solution a cloudy appearance which increases as heating of the sea water progresses. The scale gradually accumulates in thickness on the heating coils of the evaporator which is continuously fed with fresh sea water, the scale finally reducing the heat transfer rate from the heating coil into the aqueous phase until the temperature differential of the steam in the coil and the brine solution must exceed 45° F. to effect evaporation of water from the aqueous phase at any appreciable rate.

In the following run utilizing the multiple effect process of this invention a liquid heat transfer fluid at a temperature above the boiling point of the sea water is continuously charged into the evaporation zone of the first effect, evaporating water from the solution. As the sea water is heated to its boiling point and as water is evaporated therefrom, the precipitated alkaline earth metal carbonates, oxides, etc., remain in suspension in the residual brine or are continuously removed by filtering a slip-stream of the finely divided suspension of solids in the brine from one or more of the evaporators of the multiple effect series. In the present run, the brine residue in the 2nd and 4th effects was withdrawn continuously from the evaporator vessels of these effects, at a rate of 10% of the brine per hour, filtered and reintroduced into the same evaporator vessels at the temperature the streams were withdrawn. As the concentration of sodium chloride exceeds the limit of solubility at the particular temperature at which the water is evaporated from the solution, the resulting precipitated sodium chloride is also suspended in the residual brine and is simultaneously filtered from the slip stream, thereby avoiding the precipitation of salt crystals on the surfaces of vessels and heat transfer equipment in contact with the brine solution.

The improvement of the multiple-effect system to which the present invention is directed comprises introducing the heat of vaporization into each evaporator vessel of each effect in series by charging a substantially non-volatile heat transfer oil (which in the present run is diphenylethane, having a boiling point of over 500° F. at atmospheric pressure and a specific heat, $C_p$, of 0.60) directly into the aqueous brine present in the evaporator vessel of each effect, the heat transfer oil being heated to a temperature above the boiling point of the brine in each serially downstream evaporator by heat exchange with steam entering the condenser from the evaporator of the last previous upstream effect. The heat transfer liquid is separated from the aqueous brine phase in the brine settler connected to each evaporator of each effect and is pumped into the bottom of the last previous upstream condenser, absorbing heat of condensation in the condenser and then recharged into the evaporator from which it was initially withdrawn.

The multiple effect process provided in the present run is effected in a series of seven stages, each stage consisting of an evaporator vessel and a condenser interconnected by a pipe which transfers the water vapor from the vapor space in the upper end of the evaporator into the bottom of the condenser vessel of each effect where relatively cool heat transfer fluid from the downstream brine settling vessel, absorbing the heat of vaporization from the steam leaving the evaporator, as hereinafter more fully described.

Two immiscible liquid phases are continuously formed in each of the evaporator and condenser vessels and these liquids are separated by continuously withdrawing portions of both liquids simultaneously from the interfaces in each vessel as the liquids accumulate therein into separate settling vessels where the liquids stratify into layers. The upper layer oil phase in the condensate settling vessel is transferred into the brine solution of the next downstream evaporator at an elevated temperature relative to the brine solution temperature, where the heat of vaporization recovered from the steam vapors in the preceding upstream condenser is transferred by direct heat exchange with the brine solution charged into the next downstream effect. The lower liquid layer in the condensate settler consists of pure, condensed water vapor and is withdrawn, as formed, to a product receiver. This product contains less than 2 p.p.m. of dissolved diphenylethane which is removed therefrom by passing the water condensate through a bed of activated charcoal (hardwood char activated at 350° C.).

The two-layer liquid phases accumulating in the brine settling tank connected to each evaporator vessel, withdrawn from the evaporator at the liquid-liquid interface therein, consists of an upper layer heat transfer liquid phase from which heat of vaporization sufficient to produce the steam vapors entering the condenser vessel has been removed and a lower layer brine solution, comprising the residue of sea water from which the evaporated water has been removed as steam in the evaporator vessel. The brine in liquid phase is transferred into the next downstream evaporator vessel operated at a lower pressure than the pressure in the evaporator from which it was removed and at a lower temperature corresponding to the boiling point at said lower pressure.

Evaporator vessel No. 1 (of the first effect in series) is maintained at a pressure of 120 pounds/in.$^2$, absolute (p.s.i.a.) and the diphenylethane heat transfer fluid continuously charged from an external heater into the evaporator vessel enters the bottom of the vessel at 450° F., at a flow rate of 13.5 pounds of oil per pound of water evaporated. The heated diphenylethane transfers 877 B.t.u. per pound of water evaporated to the sea water in the first evaporator vessel and after giving up its heat to the sea water feed stock, it flows at 342° F. from the brine-oil interface in the evaporator into the brine settling vessel connected to the evaporator. From the upper layer of the two liquid phases separating in the brine settling vessel the oil is continuously withdrawn, heated to 450° F. in the external heater and recycled at 120 p.s.i.a. directly into the evaporator vessel of effect No. 1 for direct contact in liquid phase with the liquid sea water in the latter vessel.

Each evaporator and condenser vessel for each effect is a vertical, cylindrical tank in which the liquid phases accumulate as distinct layers separated by an oil-aqueous phase interface. Each vessel contains a distributor head for dispersing the influent fluids entering the lower section of the vessels; in the condenser, a spray head disperses the steam vapors flowing into the bottom of the vessel from the evaporator and in the evaporator, a spray head disperses the liquid oil into finely divided droplets which enter the bottom of the vessel containing liquid sea water or brine. The heat transfer oil charged into each condenser from the brine settling vessel of the next downstream effect also enters the bottom of each condenser of each effect as fine droplets through a spray head, permitting maximum time and contact surface between the oil and aqueous phases rising to the oil-water interface in each condenser. Although the fluids flow between effects at decreasing downstream pressures (except the heat transfer oil from the brine settler to the preceding upstream condenser) and thus would flow under the effects of gravity, in order to obtain the spray effect in each vessel, the liquids are preferably pumped between effects under pressure.

Brine residue of the first effect evaporator flows as a continuous stream into an outlet conduit of the brine settling tank connected to evaporator No. 1, the inlet to the conduit being at the oil-brine interface therein to thereby remove both oil and brine phases simultaneously from the evaporator into the brine settling tank. The first effect brine residue which contains 31.4 lbs. of water per pound of solute solids thereafter flows downstream from the first effect brine settling vessel into evaporator vessel No. 2 of the second effect. The heat transfer oil continuously circulated at a rate of 97.5 lbs. of diphenylethane per pound of water evaporated in the first effect flows from the second effect brine settler tank into the first effect condenser. It is then recovered from the first effect condensate settler as the upper layer above the interface therein, and enters condenser No. 1 at a temperature of 324° F. By intimately contacting the steam vapor entering condenser No. 1 from the first effect evaporator, the oil recovers substantially all of the latent heat of evaporation carried by the steam vapors from the first effect evaporator and leaves the condensate settling vessel of the first effect at 339° F. to flow into the second effect evaporator. The pressure maintained in evaporator No. 2 is 90 p.s.i.a. and the liquid brine phase is maintained at a temperature of 322° F. via heat exchange with the heat transfer oil at 339° F. from condensate settling vessel No. 1.

Using a similar flow pattern for the heat transfer fluid, residual brine and steam vapors, evaporation is continued through a series of 5 additional effects. Residual aqueous brine progressively increases in solute concentration as the brine residue flows from one effect into the next downstream effect, successively from the brine settling vessel of the first effect into the 2nd effect evaporation vessel and thereafter into each succeeding evaporator from the brine settler of the preceding effect; the heat transfer liquid flows from the brine settling vessel of each effect into the bottom of the vapor condenser of the preceding effect (except in the first and seventh effects). As heretofore described, the heat transfer liquid from the upper layer in the first effect brine settling tank is pumped into a heater where it is reheated to 450° F. and is thereafter recycled into the bottom of the first effect evaporator. The diphenylethane upper layer separating in the condensate settling vessel connected to the seventh effect condensation vessel is removed therefrom at 217° F., heat exchanged with cooling water in a tube and fin heat exchanger to a temperature of 70° F. (using water at 62° F. for cooling) and then recycled to the seventh effect condenser vessel at a temperature of 65° F. for use as the heat sink in the 7th effect condenser for the condensation of water vapor from the seventh effect evaporator. Approximately 4011 B.t.u./lb. of water evaporated in the first effect are removed from the steam vapors by the heat transfer fluid and thereafter transferred to the cooling water; pure water is withdrawn from the lower layer of the condensate settler of each effect; concentrated brine (containing 8.0 percent by weight of solids, partly in solution and partly in suspension) is withdrawn from the lower aqueous layer of the brine settling tank of the seventh effect and discharged from the process.

The temperature, pressure, solute concentration and other process conditions existing in each effect, with respect to both the evaporator and condenser vessels and the quantities of water evaporated, the volume and temperatures of the heat transfer fluid involved in the evaporation and condensation stages of each effect are set forth in the following Table II, below:

TABLE II.—OPERATING CONDITIONS IN THE MULTIPLE EFFECT EVAPORATION OF SEA WATER UTILIZING A HEAT TRANSFER FLUID

| No. of Effect | In The Evaporator Unit of Each Effect | | Heat Transfer Liquid [2] | | | In The Condenser Unit [1] | | | |
|---|---|---|---|---|---|---|---|---|---|
| | Temp., °F. | Press., lb./in.² a. | Inlet Temp., °F. | Lbs. Oil | Outlet Temp., °F. | Vapor Inlet Temp., °F. | Water Product, lbs. | Water Outlet Temp.,[3] °F. | Brine Residue, lbs. H₂O/ lbs. Solid |
| 1st | 242 | 120 | 450 | 13.6 | 342 | 342 | 1.0 | 341 | 31.4 |
| 2d | 322 | 90 | 339 | 97.5 | 324 | 322 | 1.72 | 321 | 29.69 |
| 3d | 302 | 68 | 319 | 170.8 | 304 | 302 | 2.37 | 301 | 27.32 |
| 4th | 282 | 50 | 299 | 239 | 284 | 282 | 2.94 | 280.7 | 24.38 |
| 5th | 261.7 | 35.5 | 278.7 | 302 | 263.7 | 261.7 | 3.44 | 260.2 | 20.94 |
| 6th | 241.2 | 24.7 | 258.2 | 359 | 243.2 | 241 | 3.82 | 239.3 | 17.19 |
| 7th | 220.3 | 16.4 | 237.3 | 405 | 222.3 | 220.3 | 4.15 | 217.7 | [4] 12.98 |

[1] Heat removed from water vapors in the condenser unit of 7th effect (cool oil supplied to condenser cooled to 217.7° F. by heat transfer oil supplied at 216° F.) is 4,011 B.t.u. per pound of water evaporated in the first effect of series.

[2] Heat input in reboiler of evaporator of first effect of series (i.e., as latent heat of evaporation of water) is 877 B.t.u./lb. of water evaporated from first effect. Heat input in raising the temperature of the sea water from 71° F. to 342° F. (i.e., to its incipient boiling temperature) prior to entering the first effect evaporator vessel is 8,854 B.t.u./lb. of water evaporated in the first effect.

[3] Heat removed in water condensate products, based upon temperature differential between effluent condensed water (from 341° F. to 218° F.) and inlet feed stock sea water (71° F.): 3,798 B.t.u./lb. of water evaporated in first effect.

[4] Heat removed in brine residue, based upon temperature differential between effluent brine (220.3° F.) and inlet feed stock solution (71° F.) is 1,970 B.t.u./lb. of water evaporated in the first effect.

It will be noted that heat in the amount of 4,011 B.t.u./lb. of water evaporated in the first effect must ultimately be removed in the condenser of the seventh effect and except for the sensible heat removed in the combined solvent condensate of all the effects the heat removed from the system through this outlet represents one of the major losses of energy from the process. This residue of sensible heat is, however, at least partially recoverable and available for further evaporation (albeit at successively lower temperatures) of additional water from the brine solution leaving the seventh effect. Thus, by operating the next effect (i.e., a projected 8th effect) at a subatmospheric pressure it is feasible to evaporate an additional quantity of water from the brine removed from the 7th effect evaporator, depending upon the pressure maintained in the 8th and any further downstream effects, which determines the temperatures of the aqueous solution in these effects. Similarly, the ninth, tenth, etc., effects may be added to the series, each downstream effect being operated at progressively lower pressures and temperatures. Beyond the 8th and more assuredly, beyond the 9th effect, however, the limit of solubility (at about 26% by weight) of sodium chloride in the brine is exceeded and successively larger quantities of salt crystals are precipitated from the brine solution, increasing the problem of handling solids precipitated from the brine as water is removed therefrom. Thus, the brine residue is generally filtered after each effect to remove from the brine solution any salt or minerals of low solubility precipitated therefrom as the brine residue becomes progressively more concentrated.

As solids precipitate from solution, and particularly, as normally scale-forming alkaline earth metal carbonates and sulfates precipitate from solution during the direct heat exchange of the sea water and brine with the diphenylethane heat transfer fluid, the solids remain in finely divided suspension in the aqueous phase and therefore do not necessarily complicate the handling of the aqueous phase, particularly if the resulting suspension (or slip-stream portions thereof) is filtered from the brine between effects.

The heat transfer liquid utilized herein (i.e. diphenylethane) has such slight solubility in the water and salt solutions at any temperature that these aqueous fluids do not dissolve sufficient diphenylethane to impart a noticeable odor of dissolved hydrocarbon to these fluids. The slight retention of hydrocarbon by the water product, however, is eliminated by passing the product in liquid phase through a bed of activated char, silica gel, or clay.

The foregoing seven-effect evaporation system when repeated using decafluorobiphenyl as the heat transfer fluid also operated effectively and provides the additional advantage over the hydrocarbon (diphenylethane) heat transfer fluid specified above that it is even less soluble and a more effective foam depressant than the hydrocarbon used in the preceding run.

*Example II*

The seven-effect process described above is repeated in the following run except that the process flow described in Example I is modified to the extent that the heat content of some of the effluent fluid streams of the process flow (including the brine residue of the 7th effect evaporator and the heat transfer fluid removed from the 7th effect condensate settler) is recovered by heat exchange with the cold, inlet sea water feed stock. The heat thereby recovered is sufficient to raise the temperature of the sea water nearly to its boiling point before it enters the first effect.

The feed stock solution at a flow rate of 33.4 lbs./lb. of water evaporated in the first effect of the series and at an inlet temperature of 71° F. is first heat exchanged in a jacketed, coiled-tube of heat exchanger with the cold inlet sea water circulated through the jacket at a rate of 13.98 lbs./lb. of water vaporized in the first effect. The effluent brine solution, at a temperature of 220.3° F., enters the end of the jacket out of which heated sea water flows from the coil, the sea water being raised via the heat exchange to a temperature of 129.5° F., an increase of 58.5° F. above the 71° F. inlet temperature of the sea water.

The sea water thus initially warmed is then heat exchanged with the heat transfer fluid recovered from the seventh effect condensate settler, in a jacketed-tube type of heat exchanger. The heat transfer fluid at a rate of 86 lbs. of fluid per lb. of water evaporated in the first effect enters the heat exchanger at 216° F. (being heated to this temperature in the seventh effect condensation zone) and leaves at 171° F., giving up as heat of condensation 4011 B.t.u. per lb. of water evaporated in the first effect, equivalent to the 4.145 lbs. of water evaporated from the brine in the 7th effect.

The sea water effluent of the heat exchanger leaves the latter unit at 214° F. and is transferred directly to the first effect evaporation zone as the source of feed stock therein, having recovered 2820 B.t.u. of the 4011 B.t.u. of heat available from the 7th effect heat transfer fluid or 71 percent of the heat lost in the preceding Example I in which the heat present in the heat transfer fluid of the 7th effect condensation zone is heat exchanged with a fluid from a source external to the process flow.

In the seventh effect condensation zone, the heat transfer fluid from the sea water heat exchange unit enters the 7th effect condensation zone at 171° F., contacting water vapor leaving the 7th effect evaporation zone at 218° F. By way of heat exchange of the water vapor with heat transfer fluid in the 7th effect condensation zone, water at 216° F. is withdrawn from the 7th effect condensate settler zone and heat transfer fluid at 216° F. is returned to the sea water feed stock heat exchange unit.

I claim as my invention:

1. A multiple effect evaporation process for separating a volatile solvent from a brine solution of a non-volatile salt in said solvent, each effect comprising an evaporation zone and a vapor condensation zone which is connected in vapor flow relationship to its associated evaporation zone, the pressure maintained in each effect being less than the pressure maintained in the last preceding upstream effect of the series, said process comprising introducing said solution into the evaporation zone of the first effect of said series and, except for the last effect in the series, passing the resuling more concentrated brine solution from the evaporation zone of each effect into the evaporation zone of the next succeeding downstream effect, contacting directly the solution in each evaporation zone with a heat transfer liquid independently supplied at an elevated temperature relative to the temperature of said solution, said heat transfer liquid being essentially immiscible with said solution and boiling at a temperature substantially greater than the boiling point of said solution to produce solvent vapor, withdrawing the resulting solvent vapor from each evaporation zone into the condensation zone directly associated with the evaporation zone, contacting directly solvent vapor in said condensation zone with a relatively cool heat exchange medium which in each effect, except the last effect of the series, consists of heat transfer liquid recovered from the evaporation zone of the next succeeding downstream effect in series, separating by density difference the heat transfer liquid at a relatively elevated temperature from solvent condensate liquid present in each condensation zone into which relatively cool heat transfer liquid is charged, recycling the recovered heat transfer liquid to the evaporation zone of said next succeeding downstream effect, withdrawing solvent condensate from each condensation zone as one of the products of the process and withdrawing concentrated brine solution from the evaporation zone of the last effect and recovering the brine as another product thereof.

2. The process of claim 1 further characterized in that said solution is an aqueous solution of a salt, at least one salt component of which comprises an alkaline earth metal compound which forms a precipitate upon removal of a portion of the water from said solution.

3. The process of claim 2 further characterized in that said solution is sea water.

4. The process of claim 1 further characterized in that said heat transfer liquid boils at a temperature at least 30° C. above the boiling point of said solution.

5. The process of claim 4 further characterized in that said heat transfer liquid boils at a temperature at least 80° C. above the boiling point of said solution.

6. The process of claim 1 further characterized in that said heat transfer liquid is a hydrocarbon.

7. The process of claim 6 further characterized in that said hydrocarbon is an aliphatic hydrocarbon.

8. The process of claim 7 further characterized in that said aliphatic hydrocarbon is a normal paraffin.

9. The process of claim 8 further characterized in that said normal paraffin hydrocarbon is selected from the group having from 8 to about 20 carbon atoms per molecule.

10. The process of claim 6 further characterized in that said hydrocarbon is a mixture comprising aliphatic components containing from about 10 to about 20 carbon atoms per molecule.

11. The process of claim 1 further characterized in that said heat transfer liquid is a fluorocarbon.

12. The process of claim 1 further characterized in that said brine solution removed from the evaporation zone of at least one of the intermediate effects in the series is filtered to remove from said brine solution insoluble components precipitated during evaporation in the preceding upstream effect.

13. The process of claim 1 further characterized in that the temperature of said solution is raised prior to contacting said heat transfer fluid in said first effect of the series by heat supplied from a source external to the first effect.

14. The process of claim 13 further characterized in that said solution is at least partially heated by heat exchange with brine recovered from the evaporation zone of the last effect in the series.

15. The process of claim 13 further characterized in that said solution is heated prior to its introduction into the evaporation zone of the first effect by heat exchange with the solvent vapor formed in the last effect of the series.

16. The process of claim 13 further characterized in that said solution is heated prior to its introduction into the first effect of the series by heat exchange with the solvent condensate recovered from at least one of the condensation zones of the series of effects comprising said process.

17. The process of claim 1 further characterized in that the evaporation zone of the first effect in the series is maintained at a superatmospheric pressure.

18. The process of claim 1 further characterized in that said solution is fed into the first effect of the series continuously as heat transfer fluid in vapor phase is charged continuously into the evaporation zone of the first effect.

19. A multiple effect evaporation process for separating a volatile solvent from a brine solution of a non-volatile salt in said solvent, each effect comprising an evaporation zone and a vapor condensation zone which is connected in vapor flow relationship to its associated evaporation zone, the pressure maintained in each effect being less than the pressure maintained in the last preceding upstream effect of the series, said process comprising:

(1) contacting directly the solution in each evaporation zone with a heat transfer liquid supplied at an elevated temperature relative to the temperature of said solution to produce solvent vapor, said heat transfer liquid being essentially immiscible with said solution and boiling at a temperature substantially greater than the boiling point of said solution:

(2) withdrawing the resulting solvent vapor from each evaporation zone and introducing it into the condensation zone directly associated with the evaporation zone;

(3) contacting directly solvent vapor in said condensation zone with a relatively cool heat exchange medium which in each effect, except the last effect of the series, consists of heat transfer liquid recovered from the evaporation zone of the next succeeding downstream effect in series as provided in step (9) below;

(4) maintaining two liquid phases in each of said evaporation and condensation zones;

(5) withdrawing a mixture of both liquids from the interface between said liquids in the condensation zone into a condensate settling vessel;

(6) withdrawing a mixture of both liquids from the interface between said liquids in the evaporation zone into a brine settling vessel;

(7) withdrawing solvent condensate from said condensate settling tank as one of the products of the process;
(8) separately withdrawing heat transfer liquid at a relatively elevated temperature from said condensate settling vessel and charging the same into the evaporation zone of the next adjacent downstream effect;
(9) withdrawing said relatively cool heat exchange liquid medium from the brine settling vessel and charging said liquid medium into the condensation zone of the next upstream effect as the source of heat transfer liquid therein;
(10) withdrawing brine solution from said brine settling vessel and, except in the last effect in the series, discharging said brine solution into the evaporation zone of the next downstream effect.

References Cited by the Examiner

UNITED STATES PATENTS

| | | | |
|---|---|---|---|
| 1,225,226 | 5/1917 | Doherty | 203—100 X |
| 1,547,893 | 7/1925 | Bergius | 203—100 X |
| 1,986,431 | 1/1935 | Gray | 203—97 X |
| 2,151,990 | 3/1939 | Ruys | 203—47 |
| 2,315,422 | 3/1943 | Hildebrandt | 203—47 |
| 2,502,485 | 4/1950 | Saunders et al. | 203—47 X |
| 2,653,912 | 9/1953 | Ross et al. | 260—649 |
| 2,749,094 | 6/1956 | Lewis et al. | 202—158 X |
| 2,976,224 | 3/1961 | Gilliland | 203—100 X |
| 3,219,554 | 11/1965 | Woodward | 203—11 X |
| 3,232,847 | 2/1966 | Hoff | 202—173 X |
| 3,236,747 | 2/1966 | Margiloff | 203—100 X |

FOREIGN PATENTS 841,374  7/1960  Great Britain.

OTHER REFERENCES

Hackh's Chemical Dictionary, page 635, 3rd edition (1944).

NORMAN YUDKOFF, *Primary Examiner.*

F. E. DRUMMOND, *Assistant Examiner.*